May 17, 1938.  A. E. JESSER  2,117,807
GASKET CLOSURE
Filed April 18, 1936
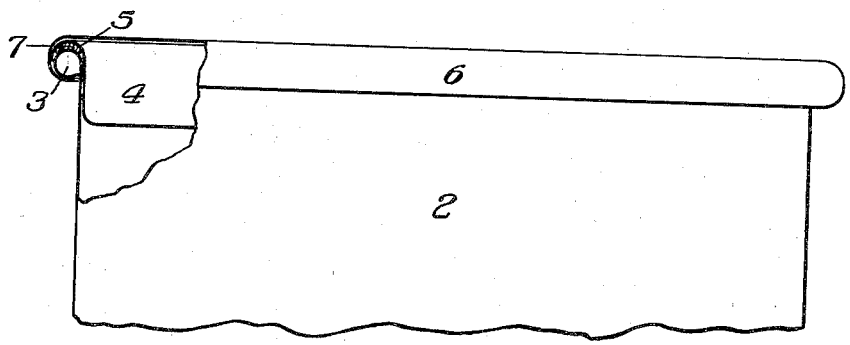
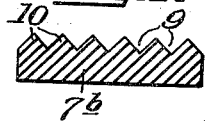
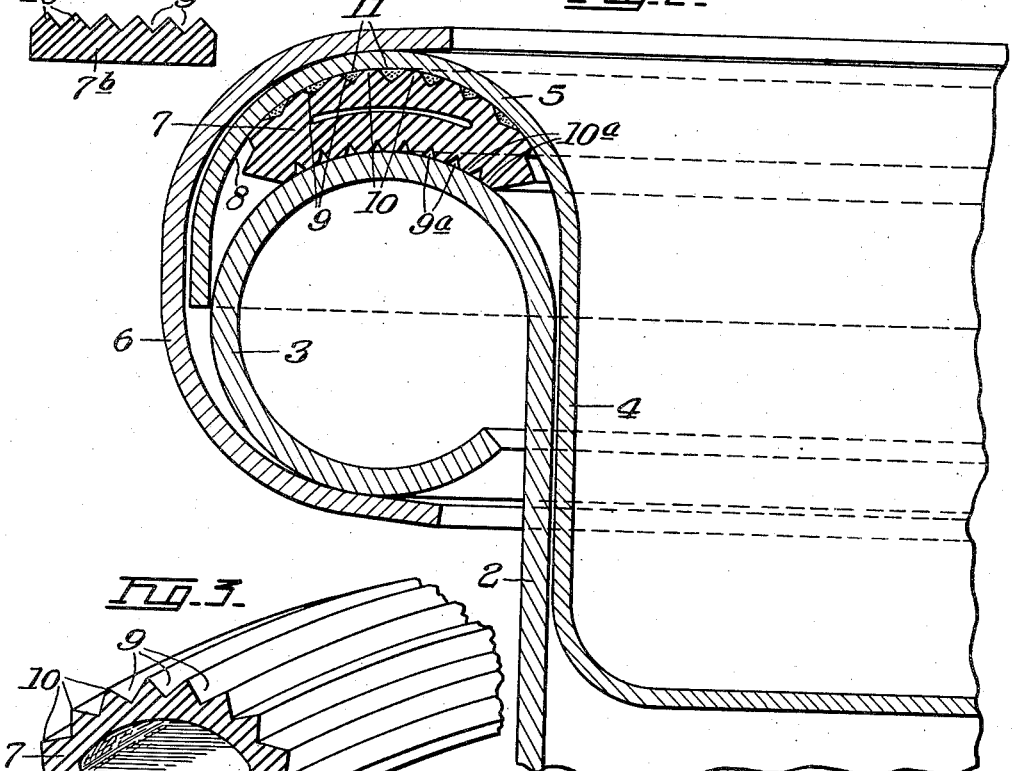
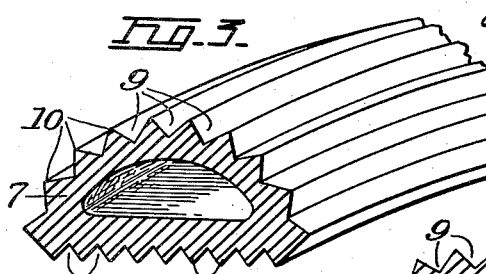
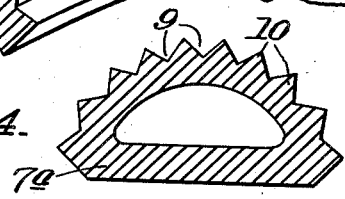
INVENTOR.
Albert E. Jesser
BY Clarke & Doolittle
ATTORNEY Patented May 17, 1938

2,117,807

UNITED STATES PATENT OFFICE 2,117,807

GASKET CLOSURE

Albert E. Jesser, Butler, Pa., assignor to Pittsburgh Steel Drum Company, Pittsburgh, Pa., a corporation of Pennsylvania Application April 18, 1936, Serial No. 75,218

4 Claims. (Cl. 220—46)

My invention relates to improvements in gasket closures particularly adapted for drums, barrels and other containers.

Containers of the character contemplated include a cover or head to be secured to the container with an intervening sealing gasket or packing, and it is common practice to cement such gasket to either the head or body of the container.

Frequently, upon closing and sealing such a container, the resulting compression of the gasket tends to displace some of the cement, causing the same to leak into the container and damage the contents thereof.

It is a prime object of this invention to provide a gasket closure of the character stated wherein the customary cement may be effectively confined against undesirable leakage when the closure is subjected to compression.

A further object is to provide in such a closure, means for receiving and retaining the cement, which means are formed in a manner to give adequate sealing effect and efficiency per se.

Additional objects and advantages will be readily apparent from the following description taken in connection with the accompanying drawing, wherein:

Fig. 1 is a part sectional and part elevational view of a portion of a steel drum illustrating the application of my gasket closure;

Fig. 2, an enlarged view of the sectional portion of Fig. 1;

Fig. 3, a sectional perspective view of my gasket construction; and

Figs. 4 and 5, detail sectional views of modified forms of gasket.

Referring to the drawing, the drum or barrel illustrated includes a hollow body 2 of cylindrical form permanently closed at the bottom (not shown). The upper end of said body is completely open and is provided with an annular bead or rim 3, preferably comprising a hollow circumferential rolled member substantially circular in cross-section.

A removable head or cover 4 is designed for insertion in the open end of the drum or container, and is formed with a circumferential outwardly rounded or channelled rim or flange 5 substantially semi-circular in cross-section, for telescoping engagement over the drum bead 3. 6 designates a sealing ring of channel form in cross-section having spaced flanges for embracing engagement over the head flange 5 and under the drum bead 3. Said ring may be continuous as shown, having its flanges mechanically crimped or pressed into holding engagement with the head and bead, or may be of the split type, having suitable means for closing and securing the same on the drum, as will be readily understood.

Designed for insertion between the bead 3 of the drum and the embracing flange 5 of the drum head, I provide an annular or ring gasket 7, preferably hollow, formed of rubber or other suitable elastic material, and preferably having a substantially semi-circular or segmental cross-section, readily conforming to the inner surface 8 of the drum head flange or rim 5, whereby said gasket may be applied to said rim and cemented to said surface.

As will be readily seen in Figs. 1 and 2, when such a gasket is disposed between the drum and its head, and is subjected to the compression of the applied clamping ring 6, the gasket is reduced transversely and displaced laterally between the flange 5 of the head and the drum bead 3, affording an extended sealing contact therebetween.

At the same time, the lateral displacement or extension of the gasket tends to likewise displace cement or dope from between the gasket and the head flange 5, in which event the cement flows or works downwardly between the head and body of the drum into injurious contact with the drum contents.

To obviate this leakage of cement or dope, I prefer to provide the exterior of the gasket 7 with a plurality of alternate annularly extending grooves 9 and ribs 10. Those grooves or troughs 9 on the arcuate portion of the gasket serve to receive the cement or dope 11 therein for adhesion to the under surface 8 of the head flange 5.

Upon the application of transverse clamping pressure by the ring 6 as before, the cement may flow freely within the grooves or troughs 9 in the annular direction of the gasket, but is prevented from lateral displacement and leakage by means of the intervening ribs 10, the latter firmly engaging the flange surface 8.

By forming the ribs 10 of a minimum thickness at their outer edges they will be flattened or broadened upon the application of pressure, without interfering with the function of the grooves 9, and at the same time will provide adequate sealing contact and effect for the closure.

The use of alternate annular grooves 9a and ribs 10a on the bottom or flat surface of the gasket provides an efficient and improved seal between the gasket and the drum bead 3. My invention is not limited thereto however, as the closure may be effectively employed in connection with the gasket 7a as illustrated in Fig. 4, wherein the grooves 9a and ribs 10a are omitted and a plain surface substituted therefor.

Likewise, my invention may be advantageously employed with other shapes and forms of closures and gaskets. For example, the usual flat ring gasket 7b of Fig. 5 may be advantageously provided with a grooved and ribbed surface for similar action in connection with applied cement or dope.

The gaskets described herein may be constructed in the form of continuous rings, or more preferably by forming a continuous strip of the desired cross-section and having longitudinal grooves and ribs, which strip may then be cut to proper length and cemented or vulcanized into annular or ring form, as will be readily understood.

I claim:

1. The combination with a pair of members forming a closure, of a gasket disposed between said members and cemented to one of the members, means for applying a transverse sealing pressure to the gasket, said gasket having means thereon coacting with the member to which it is cemented to prevent lateral leakage displacement of the cement therebetween.

2. The combination with a container and a removable head therefor, of a gasket cemented to the head for disposition between said head and container, means for applying a transverse sealing pressure to the gasket, said gasket having grooves for receiving the cement and annularly disposed ribs in engagement with the head for preventing lateral leakage displacement of the cement.

3. The combination with a container having an annular closure bead, of a head therefor having an annular closure flange for telescoping engagement with said bead, a ring gasket cemented to the flange for disposition between said flange and bead, means for applying a transverse sealing pressure to the gasket, said gasket having on its surface annularly extending grooves for receiving the cement, and interposed annular ribs coacting with the head flange for retaining the cement in said grooves against lateral leakage displacement.

4. The combination with a container having a circumferential closure bead of circular cross-section, of a head therefor having a circumferential closure flange of semi-circular cross-section for telescoping engagement with said bead, a ring gasket of substantially semi-circular cross-section cemented to said flange and engaging the closure bead, means for applying a transverse sealing pressure to the gasket, said gasket having exterior annularly disposed grooves for receiving the cement and interposed annular ribs coacting with the closure flange for preventing lateral discharge of cement from between the gasket and said flange.

ALBERT E. JESSER.